(12) United States Patent
Rune et al.

(10) Patent No.: US 10,321,287 B2
(45) Date of Patent: Jun. 11, 2019

(54) METHOD AND DEVICE FOR EXCHANGING SIGNALLING INFORMATION

(71) Applicant: TELEFONAKTIEBOLAGET LM ERICSSON (PUBL), Stockholm (SE)

(72) Inventors: Johan Rune, Lidingö (SE); Tomas Nylander, Värmdö (SE); Bengt Persson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/315,685

(22) PCT Filed: Jun. 3, 2014

(86) PCT No.: PCT/EP2014/061474
§ 371 (c)(1),
(2) Date: Dec. 1, 2016

(87) PCT Pub. No.: WO2015/185109
PCT Pub. Date: Dec. 10, 2015

(65) Prior Publication Data
US 2017/0195820 A1 Jul. 6, 2017

(51) Int. Cl.
*H04L 1/00* (2006.01)
*H04W 48/16* (2009.01)
(Continued)

(52) U.S. Cl.
CPC ............. *H04W 4/50* (2018.02); *H04L 1/0002* (2013.01); *H04L 1/0023* (2013.01); *H04L 69/22* (2013.01);
(Continued)

(58) Field of Classification Search
CPC ... H04W 28/06; H04W 72/085; H04W 48/16; H04W 76/02; H04W 80/00; H04W 24/08;
(Continued)

(56) References Cited

U.S. PATENT DOCUMENTS

| 7,209,458 B2 * | 4/2007 | Ahvonen ................ H04L 29/06 370/328 |
| 2008/0043697 A1 * | 2/2008 | Huomo .................. H04L 47/14 370/342 |

(Continued)

FOREIGN PATENT DOCUMENTS

WO 2014012724 A1 1/2014

*Primary Examiner* — Olumide Ajibade Akonai

(57) ABSTRACT

A method and arrangement for exchanging service and RAN information. In a communication network a service providing element is enabled to adapt delivery of a service based on RAN-related parameters. The communication network comprises a RAN (Radio Access Network) node, a core network node, and the service providing element. The RAN node obtains a RAN-related parameter and sends the RAN-related parameter to the service providing element via the core network node. The core network node receives the RAN-related parameter from the RAN node, re-structures the RAN-related parameter into a data structure readable by the service providing element, and sends the re-structured RAN-related parameter to the service providing element. The service providing element is configured to receive the RAN-related parameter, and adapt a service delivery parameter based on the RAN-related parameter.

20 Claims, 7 Drawing Sheets

(51) Int. Cl.
  *H04W 76/12* (2018.01)
  *H04W 92/06* (2009.01)
  *H04W 4/50* (2018.01)
  *H04L 29/06* (2006.01)

(52) U.S. Cl.
  CPC ........... *H04W 48/16* (2013.01); *H04W 76/12* (2018.02); *H04W 92/06* (2013.01); *H04L 1/0026* (2013.01); *H04L 65/80* (2013.01)

(58) Field of Classification Search
  CPC ..... H04W 88/12; H04W 92/02; H04W 92/06; H04W 92/12; H04L 1/0026; H04L 47/24; H04L 47/10; H04L 47/14; H04L 65/80
  See application file for complete search history.

(56) References Cited

U.S. PATENT DOCUMENTS

| | | |
|---|---|---|
| 2010/0268836 A1 | 10/2010 | Jabri et al. |
| 2011/0090838 A1* | 4/2011 | Shaw .................... H04L 1/0026 370/313 |
| 2012/0155398 A1 | 6/2012 | Oyman et al. |
| 2013/0243075 A1 | 9/2013 | Dalela et al. |
| 2014/0160923 A1* | 6/2014 | Joy ................... H04W 28/0268 370/230 |

* cited by examiner

Fig. 1 (existing art)

METHOD AND DEVICE FOR EXCHANGING SIGNALLING INFORMATION

This application is a 371 of International Application No. PCT/EP2014/061474, filed Jun. 3, 2014, the disclosure of which is fully incorporated herein by reference.

TECHNICAL FIELD

The present disclosure relates to signalling in wireless communication networks. In particular, it relates to exchange of RAN (Radio Access Network)-related parameters and service information between RANs and service elements.

BACKGROUND

In telecommunication networks various communication network nodes are arranged for connecting and serving end users and their wireless communication devices with various services, such as communication possibilities with other end users or access to services at the Internet.

With reference to FIG. 1, which is a schematic overview, a scenario in a communication network will now be described with reference to an example.

The term "wireless communication device" will be used throughout this description to denote any device which is capable of wireless communications. The term wireless communication device may thus include any device, which may be used by a user for wireless communications. Accordingly, the term wireless communication device may alternatively be referred to as a mobile terminal, a terminal, a user terminal (UT), a user equipment (UE), a wireless terminal, a wireless communication device, a wireless transmit/receive unit (WTRU), a mobile phone, a cell phone, a table computer, a smart phone, etc. Yet further, the term wireless communication device includes MTC (Machine Type Communication) devices, which do not necessarily involve human interaction. MTC devices are sometimes referred to as Machine-to-Machine (M2M) devices.

The term "RAN node" will be used to denote any suitable communication network nodes of which are arranged in a communication network for providing services to wireless communication device, in accordance with an appropriate radio access technology. For instance, a RAN node may be implemented as an RNC (Radio Network Controller) in UMTS (Universal Mobile Telecommunication System) network, a WiFi Access controller in a WLAN (Wireless Local Area Network), an eNodeB in an LTE (Long Term Evolution) network, etc.

Communication network nodes and wireless communication devices are offered by a number of vendors. Standardisation organisations, such as the 3GPP (Third Generation Partnership Project) establish standards to ensure that communication network nodes of different vendors will be able to operate together in the communication networks.

In order to make better use of installed communication resources and improve the end user experience there is therefore a need to enable service nodes to provide service information to RANs, and correspondingly for RANs to provide RAN-related information to the service elements.

SUMMARY

It would be desirable to obtain improved performance for services in communication networks. It is an object of this disclosure to address at least any of the issues outlined above.

Further, it is an object to provide RAN-related parameters to service providing elements, and service information to RAN nodes. These objects may be met by a method and an arrangement according to the attached independent claims.

According to one aspect, a communication network is provided for enabling a service providing element to adapt delivery of a service based on a RAN-related parameter. The communication network comprises a RAN (Radio Access Network) node, a core network node, and the service providing element. The RAN node is configured to obtain a RAN-related parameter and send the RAN-related parameter to the service providing element via the core network node. The core network node is configured to receive the RAN-related parameter from the RAN node, re-structure the RAN-related parameter into a data structure readable by the service providing element, and send the re-structured RAN-related parameter to the service providing element. The service providing element is configured to receive the RAN-related parameter, and adapt a service delivery parameter based on the RAN-related parameter.

Furthermore, the service providing element may be further configured to obtain service information of at least one service being applied, and send the service information to a RAN node via the core network node. The core network node may be further configured to receive the service information, re-structure the service information into a data structure readable by the RAN node, and the RAN node may be further configured to receive the service information and adapt at least one RAN-setting based on the service information.

According to another aspect, a method performed by a RAN node is provided for enabling a service providing element in communication with the RAN node, to adapt delivery of a service being performed in a communication network. The method comprises obtaining a RAN-related parameter, and providing the RAN-related parameter to the service providing element, such that the service providing element can adapt a service delivery parameter based on the RAN-related parameter.

Furthermore, the RAN-related parameters may by included in uplink messages to a core network node to be forwarded to a service providing element in a data structure readable by the service providing element. The uplink messages may be sent in GTP (General Packet Radio Service Tunneling Protocol) extension headers or GTP payload, to be re-structured into an IP-packet before being sent to the service providing element. The uplink messages may further include IP-addresses or other suitable identifiers of the service providing elements. The method may also further comprise receiving service information from the service providing element, and controlling RAN-related parameters thereupon.

According to a further aspect, a RAN node, which is adapted to perform the method steps of the above described method, is also provided. The RAN node comprises a controller and a communication module arranged therefore.

According to another aspect, a method performed by a service providing element is provided, for enabling RAN node in communication with the service providing element to improve RAN settings. The method comprises obtaining service information of at least one service being applied, and providing the service information to the RAN node, such that the RAN node can adapt a RAN-related parameter based on the service information.

Furthermore, providing the service level information may comprise sending the service information included in at least one downlink messages to a core network node, the service information to be forwarded to the RAN node in a data structure readable by the RAN node. The downlink messages may be sent in IP-packets to the core network node, to be re-structured into GTP extension headers or into GTP payload before being sent to the RAN node. The downlink messages may further be provided by identifiers of appropriate wireless communication devices, such as IP-addresses. In addition, the method my further comprise receiving a further RAN-related parameter from the RAN node, wherein the further RAN-related parameter relates to current radio conditions of the RAN, and controlling a service setting, such as rate adaption or choice of interval adaption, based on the received further RAN-related parameter.

According to a further aspect, a service providing element, which is adapted to perform the method steps of the above described method, is also provided. The service providing element comprises a controller and a communication module arranged therefore.

By arranging functionality in service providing elements for receiving RAN-related parameters, and taking received RAN-related parameters into account when controlling service parameters, an efficient usage of installed communication resource may be achieved. Furthermore, by arranging functionality in core network nodes for restructuring service information between appropriate data structures, signalling information may be effectively conveyed between RANs and service domains.

By exchanging service information and RAN-related information in communication networks, service quality may be improved, e.g. improved Quality of Experience (QoE). In addition, more efficient radio resource utilization may be achieved.

BRIEF DESCRIPTION OF DRAWINGS

The solution will now be described in more detail by means of exemplary embodiments and with reference to the accompanying drawings, in which.

DETAILED DESCRIPTION

Figure 1:
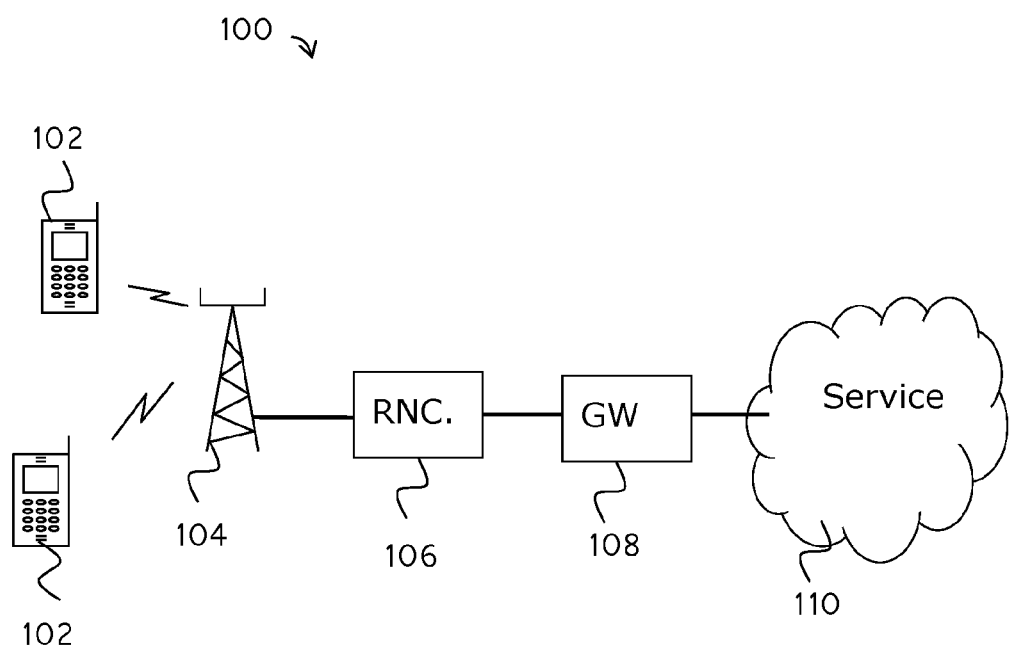
FIG. 1 is a schematic illustration of a scenario in accordance with existing art.
Figure 2:
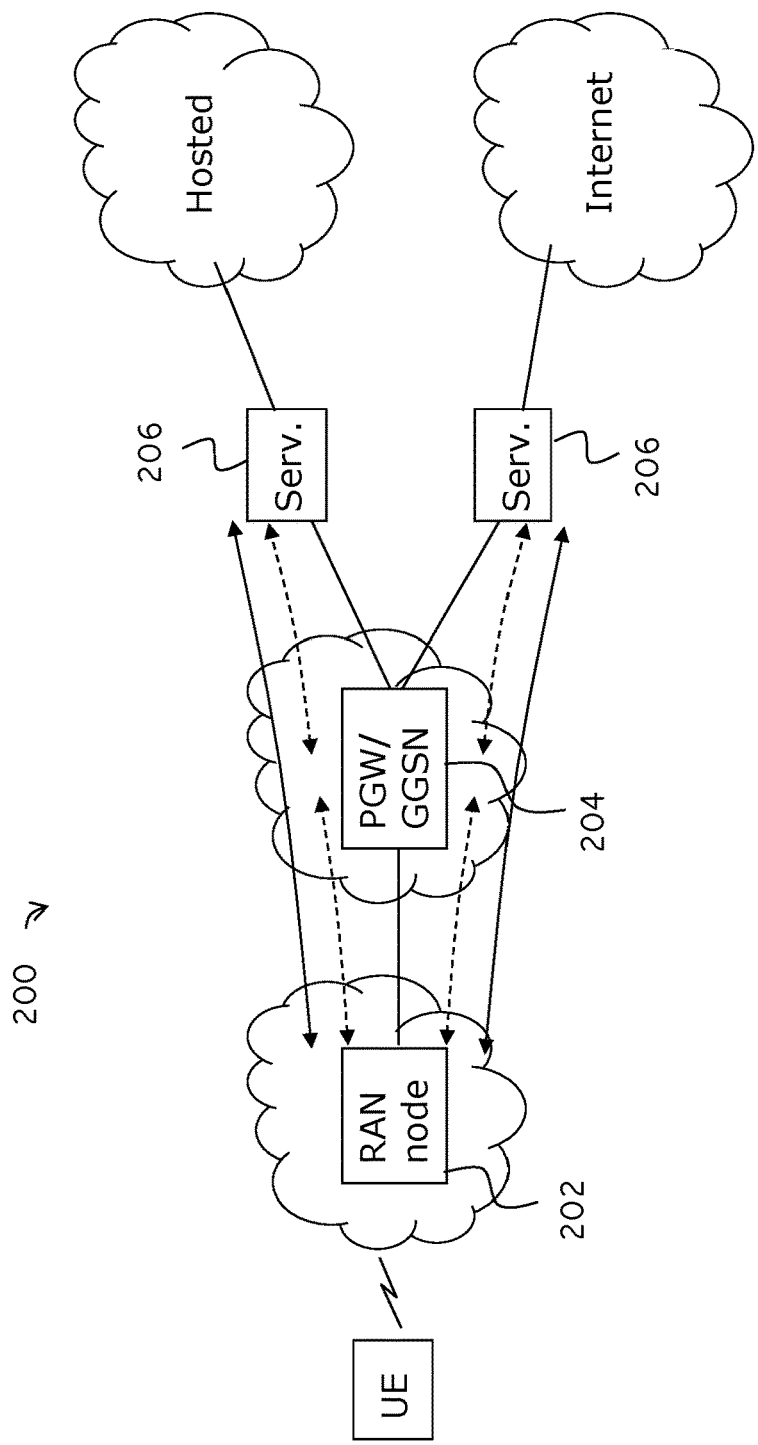
FIG. 2 is schematic block diagrams of an arrangement, according to a possible embodiment.

With reference to FIG. 2, which is a schematic overview, a situation in a communication network 200 will now be described in accordance with one exemplifying embodiment.

In the communication network 200, wireless communication devices, such as UEs (User Equipments), M2M devices, etc., are applying various services provided by a core network, e.g. the Internet. A RAN (Radio Access Network) node 202 of a RAN connects the wireless communication devices and conveys user data according to applied services. In this simplified overview, the RAN node 202 may be implemented as an RNC (Radio Network Controller), an eNodeB, an AP (Access Point), AC (Access Controller), or any other suitable RAN node. The RAN node 202 is connected to a core network node 204 of the core network and the core network node 204 is further connected to service providing element 206 which provides respective services. The disclosed concept is not limited to any specific radio access technology, and may be implemented in any suitable communication network when appropriate. For instance, in a UMTS (Universal Mobile Telecommunications System) network, the RAN node 202 will be implemented as an RNC (Radio Network Controller), and the core network node as a GGSN (Gateway GPRS (General Packet Radio Service) Support Node). In an LTE (Long Term Evolution) network, the RAN node 202 will instead be implemented as an eNodeB and the core network node 204 as PGW (PDN (Packet Data Network) Gateway), etc.

The service providing elements 206 are devices or units which provides suitable services to the wireless communication devices when appropriate. For instance, such service providing elements may typically be implemented as proxy servers, etc.

As will be further discussed below in conjunction with other exemplifying embodiments, the signalling information between RAN nodes and core network nodes is not structured according to the same data structure as the signalling information between the core network nodes and the service providing elements. On the first hop, i.e. between RAN nodes and core network nodes, the signalling information is sent as uplink messages in extension headers, but on the second hop, i.e. between core nodes and service providing elements, the signalling information is sent as uplink messages in IP-packets. The PGW 204 is therefore provided with functionality for unpacking signalling information received in extension headers from the RAN and packing the signalling information into IP-packets before sending the signalling information to the service providing elements 206.

Traditionally, RANs and services providing elements, such as Service Aware Proxies have not been able to exchange signalling information between each other via the core network. For traditional services there have not been any demands therefore, either. However, with emergence of more data consuming services, there have been demands for adapting RAN parameters, such as scheduling settings, according to the services being applied by wireless communication devices, e.g. in order to improve communication capacity of the services.

Thus, in accordance with the exemplifying embodiment illustrated in FIG. 2, in a scenario where a UE applies a service, the RAN node 202 obtains one or more RAN-related parameters and sends these RAN-related parameters to the service providing element 206. The RAN node 202 packs the RAN-related parameters in GTP extension headers which are sent to the PGW 204 as uplink messages according to a transport protocol which both the RAN node 202 and the PGW 204 are capable to handle. The PGW 204 receives the GTP extension headers, unpacks the GTP extension headers, and packs the RAN-related parameters into IP-packets which are sent to the service providing element 206 as uplink messages in accordance with the transport protocol. The PGW 204 obtains the used APN (Access Point Name) for the UE session, and from the GTP extension headers the PGW 204 obtains and forwards the RAN-related parameters to the service providing element 206 associated with the APN, i.e. the RAN related parameters are forwarded to the concerned service delivery node.

The respective service providing elements 206 are arranged to provide the specific services of their respective service network, and provide the signalling information according to a communication protocol which is suitable therefore. For instance, a service providing element 206 may be arranged to provide the service web browsing in the operator service network, or interact with web browsing services located on Internet, etc. However, any other suitable service which is provided by an appropriate service network, may be applied when appropriate, e.g. a service to provide video.

In the figure, two different service providing elements 206 and corresponding service networks (referred to as Hosted and Internet). However, the disclosed concept is not limited to a specific number and a network designer may apply applied for any suitable number of services.

Correspondingly, in another exemplifying embodiment which is related to the above described one, the service providing elements 206 are further adapted to obtain service related information, such as various service delivery parameters of the services being applied, and to send the service related information to the RAN node 202. In this downlink scenario, the service related information is sent as downlink messages in IP-packets to the PGW 204, which re-packs the downlink messages, i.e. unpacks the downlink messages from the IP-packets and packs the downlink messages in GTP extension headers which are sent to the RAN node 202.

In accordance with the exemplifying embodiments of this description, suitable RAN-related information which the RAN may provide to a service domain could be: current radio access technology, currently available cell capacity, currently achievable bitrate, etc, for adapting the services more optimally to the current situation. Such adaptations may e.g. consist of rate adaptation, e.g. through transcoding, burst size and burst interval adaptation or choice of time for delivery of cached content.

On the other hand, service information may be passed to the RAN, thereby enabling the RAN to e.g. adapt DRX (Discontinuous reception) cycles and state switching timers or apply service dependent scheduling in addition to regular Quality of Service (QoS) based scheduling.

Even if some vendors of communication network nodes have made attempts to exchange signalling information between RAN nodes and various service providing elements in communication networks where the vendors offer all network nodes, these solutions are typically complex, e.g. due to the fact that these solutions do not affect the core networks. In addition, in conventional communication networks the amount of network vendors are substantial, and a lack of standardisation for signalling exchange in the core network has prevented communication network nodes of different vendors to exchange signalling information between each other.

It is to be noted that the above described embodiments are described in a non-limiting manner. For instance the RAN node 202 and the service providing elements 206 may be designed for either provisioning RAN-related parameters from the RAN to the service domain, or service information to from the service domain to the RAN, or any suitable combination of RAN-related parameters and service information in any suitable direction within the disclosed concept.

Figure 3:
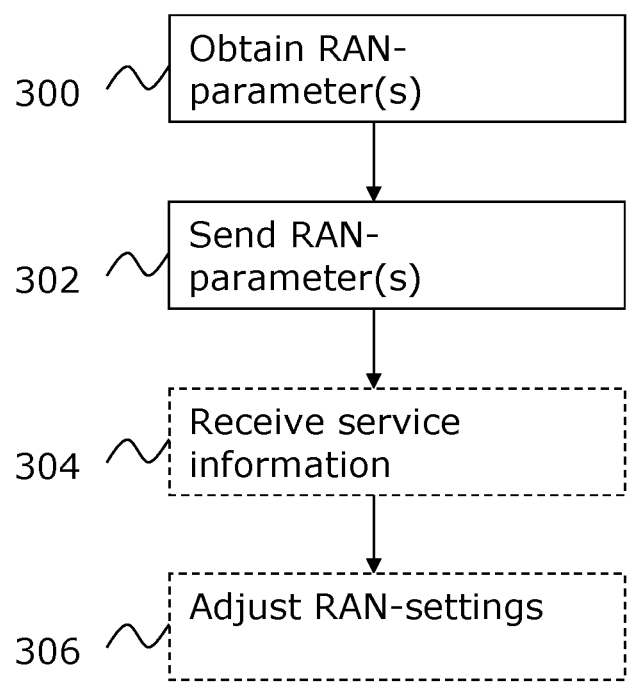
FIG. 3 is a schematic flow chart of a method, according to possible embodiments.

With reference to FIG. 3, which is a schematic flow chart, a scenario in an RNC (Radio Network Controller) of a communication network will now be described in accordance with one exemplifying embodiment. The scenario will be described for a UMTS communication network. However, the proposed concept is not limited to any specific RAT (Radio Access Technology) and may be applied for any suitable RAT, such as WLAN or LTE, etc.

The scenario which will be described relates to a communication network described above in conjunction with the FIG. 2.

In a first action 300, an RNC 202 obtains one or more RAN-related parameters. The RNC structures the RAN-related parameters into uplink messages according to a data structure which both the RNC and a GGSN (Gateway GPRS (General Packet Radio Service) Support Node) 204 are capable to communicate according to, and sends the uplink messages to the PGW 204, in a following action 302. In this embodiment, the uplink messages are sent in GTP (GPRS (General Packet Radio Service) Tunneling Protocol) extension headers.

The GGSN 204 is a core node and is arranged to restructure the uplink messages into a data structure which is readable by both the GGSN 204 and service providing elements 206. The GGSN 204 restructures the uplink messages, by first unpacking them from the GTP extension headers and then packs them into IP-packets which are sent to the appropriate service providing element 206 which the IP-packets are addressed to.

The functionality of the service providing element 206 will be described in another embodiment and will therefore not be further discussed in this embodiment.

By obtaining RAN-related parameters and provide to a service providing element 206, the service providing element may take the current RAN situation into account when delivering services, the service providing element 206 may then control which services which are currently performed and may then be able to achieve a more efficient and flexible use of installed communication resources. For instance, the service providing element may prioritise some wireless communication devices before others.

In an another exemplifying embodiment, which is based on the above described embodiment, the RNC 202 is further adapted to receive service information regarding the services which are performed from the service providing elements 206. For instance, such service information may relate to a current QoS (Quality of Service) or the nature of the service. In a following action 304, the RNC 202 receives service information from the service providing element 206 via the GGSN 204. The service information was obtained by the service providing element 206 and sent to the GGSN 204. Similarly, as the RAN-related parameters was sent in uplink messages in a first data structure, was restructured and forwarded in a second data structure, the service information which has been obtained is sent as downlink messages in IP-packets to be restructured into GTP extension headers which are received by the RNC 202.

In a final action 306, the RNC 206 adjusts one or more RAN-related parameter in accordance to the received service information. By taking service information into account when controlling RAN-parameters, a more effective use of installed communication resources in communication networks may be achieved. For instance, if one type of service requires that user data or content has a specific deadline for delivery, the RNC may prioritise downlink data to wireless communication devices of that kind of service, before other services without such deadline.

Optionally, in another exemplifying embodiment which is based on some of the above described embodiments, the RNC 202 may provide the uplink messages with further relevant information, such as IP-addresses of appropriate service providing elements or the wireless communication device, or any other suitable identifiers, e.g. to find suitable bearers in order to achieve a further more appropriate and effective addressing in the communication network.

Alternatively, the uplink messages could be sent by RNC generated GTP packets instead of using GTP packets that is a result of the UE communication. Furthermore, if RNC generated GTP packets are used, the information could be carried in extension headers and without payload, or the extension headers just include an indication that the GTP packet contains the information in the payload. Thereby, the RNC 202 does not have to wait for payload to be sent, which achieves a more efficient distribution of the uplink messages.

Figure 4:
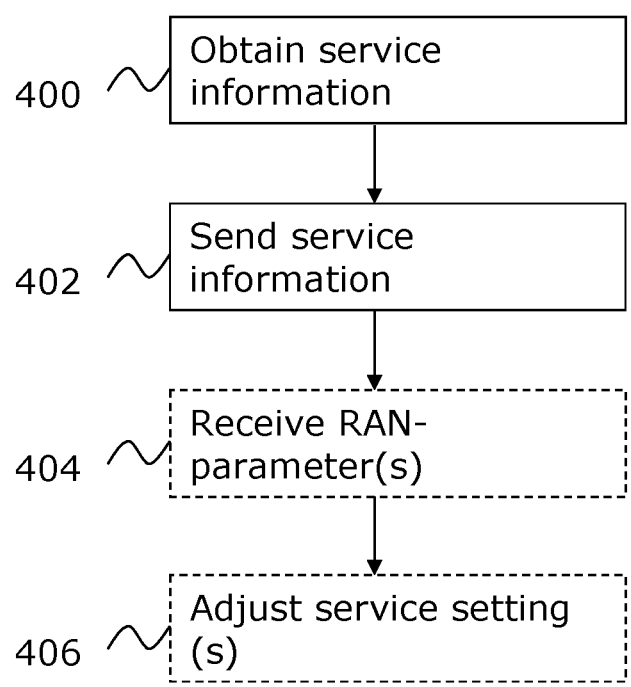
FIG. 4 is a schematic flow chart of a method, according to possible embodiments.

With reference to FIG. 4, which is a schematic flow chart, a scenario in a service providing element 206 of a communication network will now be described in accordance with one exemplifying embodiment. The scenario will be described for an LTE communication network. However, the proposed concept is not limited to any specific RAT (Radio Access Technology) and may be applied for any suitable RAT, such as WLAN or UMTS, etc.

The scenario which will be described relates to a communication network described above in conjunction with the FIG. 2.

In a first action 400, a service providing element 206 obtains service information regarding services which are applied in the communication network. The service providing element 206 structures the RAN-related parameters into downlink messages according to a data structure which both the service providing element 206 and a PGW (PDN (Packet Data Network) Gateway) 204 are capable to communicate according to, and sends the downlink messages to the PGW 204, in a following action 402. In this embodiment, the downlink messages are sent in IP-packets.

The PGW 204 is a core node and is arranged to restructure the downlink messages into a data structure which is readable by both the PGW 204 and an eNodeB 202, which the RAN node is implemented as. The PGW 204 restructures the downlink messages, by first unpacking them from the IP-packets and then packing them into GTP extension headers which are sent to the appropriate eNodeB 202 which the wireless communication device is connected to.

The functionality of the eNodeB 202 has been described in another embodiment and will therefore not be further discussed in this embodiment.

By obtaining service information and providing to an eNodeB 202, the eNodeB may take the current service situation into account when serving connected wireless communication devices, and may thereby achieve a more efficient and flexible use of installed communication resources. For instance, the eNodeB 202 may prioritise some wireless communication devices before others due to the applied services when scheduling.

In another exemplifying embodiment, which is based on the above described embodiment, the service providing element 206 is further adapted to receive RAN-related parameters regarding the eNodeBs 202. For instance, such RAN-related parameters may relate to a current radio access technology, currently available cell capacity or bitrates, current RAN states, etc. Some examples of RAN states will be given below.

In a following action 404, the service providing element 206 receives RAN-related parameters from the eNodeB 202 via the PGW 204. The RAN-related parameters was obtained by the eNodeB 202 and sent to the PGW 204. Similarly, as the service information was sent in downlink messages in a first data structure, was restructured and forwarded in a second data structure, the RAN-related parameters which was obtained is received as uplink messages in IP-packets after being restructured from GTP extension headers by the PGW 204.

In a final action 406, the service providing element 206 adjusts one or more service settings, such as rate adaption or choice of interval adaption, based on the received RAN-related parameter. By taking RAN-related parameters into account when controlling service settings, a more effective use of installed communication resources in communication networks may be achieved.

Optionally, in another exemplifying embodiment which is based on some of the above described embodiments, the service providing elements 206 may provide the downlink messages with further relevant information, such as IP-addresses of the concerned wireless communication devices, or any other suitable identifiers, indications of appropriate APNs (Access Point Names), various flow descriptors, in order to achieve a further more effective and appropriate addressing.

It is to be noted, that any of the described RAN nodes, core network nodes and service providing elements may be designed to exchange the uplink and downlink messages on a suitable level of a protocol stack when appropriate. For instance, the uplink and downlink messages may be conveyed on top of the IP (Internet Protocol) layer of with an intermediate UDP (User Datagram Protocol) layer there between.

In some embodiments, between the service providing elements 206 and the core network node 204 the UL (UpLink) and DL (DownLink) messages are conveyed in IP packets, optionally with a UDP layer between the IP layer and the UL/DL messages. This communication may take place on the same path as the user data or may be physically or virtually separated. IP addresses of the service providing elements 206 and the core network nodes 204 are used as source and destination addresses in the IP packets.

Moreover, between the core network node 204 and the RAN node, e.g. RNC or eNodeB 202 the UL/DL messages are conveyed in GTP extension headers in GTP packets on the regular user data bearers of the wireless communication devices. In the downlink the service providing element 206 has to include the IP address of the concerned wireless communication devices and an explicit or implicit (e.g. through dedicated VLAN) indication of the APN (in order to ensure UE IP address uniqueness), so that the core network node 204 can select a proper bearer for the DL message. Optionally, the service providing element 206 may also include a flow descriptor, which the core network node 204 may use to identify the specific bearer which is used for user data flows matching the flow descriptor. Depending on how the uplink addressing/routing is handled, the service providing element 206 may also include its IP address or another identifier of the service providing element 206.

Furthermore, for uplink messages the right service providing element 206 may be identified using state information in the RAN node and/or the core network node 204 and/or explicit parameters, i.e. the core network node's 204 IP address or another service providing element 206 identifier) in the UL message.

Figure 5:
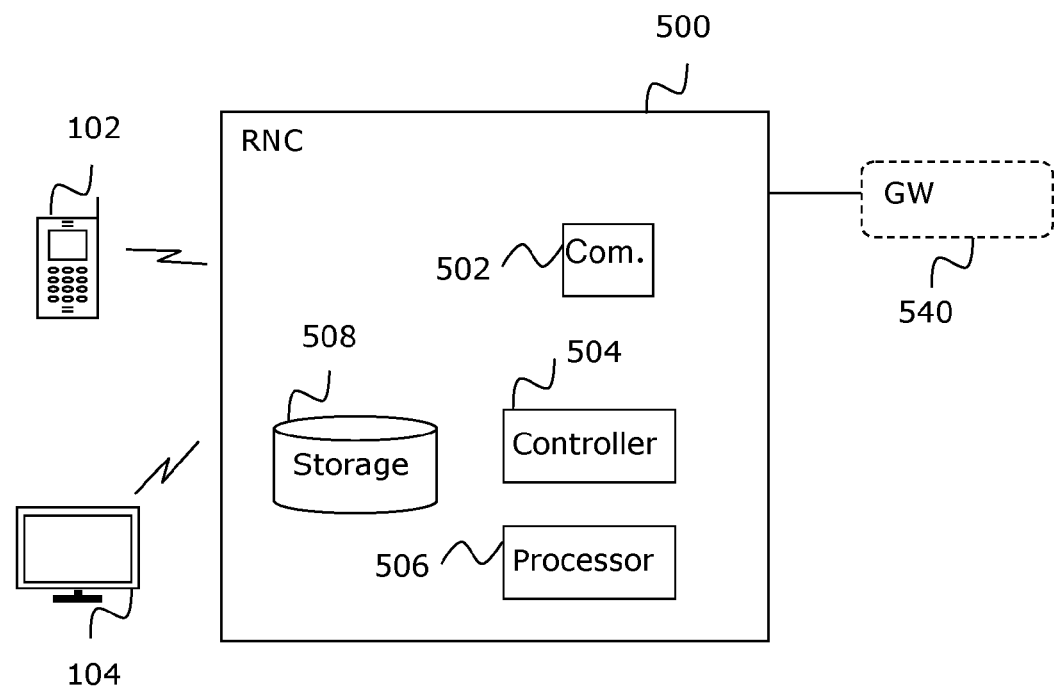
FIG. 5 is a schematic block diagram of a RAN node, according to possible embodiments.

With reference to FIG. 5, which is a schematic block diagram, an RNC 500, which is a RAN node, will now be described in accordance with one exemplifying embodiment.

The RNC 500 is adapted to connect to a plurality of wireless communication devices 102, 104 via appropriate NodeBs (not shown), and is further adapted to connect to a gateway 540 of a core network in order to provide various services to the wireless communication devices.

The RNC 500 comprises a communication module 502, a controller 504, and optionally a processor 506 and a storage module 508.

The controller 504 is arranged to obtain one or more RAN-related parameters, from the RAN. Such RAN-related parameters may be parameters of radio access technology, available cell capacity, achievable bitrate, RAN state, UE, or DRX cycles, etc.

The communication module 502 is arranged to provide the RAN-related parameters to service providing elements (not shown) of appropriate services. The service providing elements will then be able to adapt service delivery parameters according to the received RAN-related parameters. As stated above in conjunction with another embodiment, by taking the current situation of the RAN into consideration when controlling service delivery, a more effective use of installed communication resources may be achieved.

In another exemplifying embodiment, which is based on the one described above, the communication module 502 is further adapted to provide the RAN-related parameter included in uplink messages to the gateway 540 to be forwarded to the service providing element in a data structure which is readable by the service providing element. The communication module 502 is further adapted to send the uplink messages in GTP (General Packet Radio Service Tunnelling Protocol) extension headers or in GTP payload to the gateway, to be re-structured into IP-packets before being sent to the service providing element.

Moreover, the controller 504 may be further adapted to include IP-addresses of appropriate service providing elements in the uplink messages. Thereby a simplified addressing may be achieved.

In addition, the communication module 502 may be further adapted to receive service information from the service providing element, according to services being applied by the wireless communication device. The controller 504 may be further adapted to control at least one further RAN-related parameter, e.g. parameters according to DRX cycles, state switching timers, or scheduling, based on the received service information, such as Quality of Service, QoS, or nature of the service. The communication module 502 may receive the service information in downlink messages, via the gateway 540.

Optionally, the RNC 500 of the above described embodiments may comprise further components or units arranged to provide appropriate functionality. For instance, suitable processors 506 or storage units 508 may by arranged to provide improved calculation capacity for re-structuring uplink messages, or making use of statistic variations of RAN-related parameters.

Figure 6:
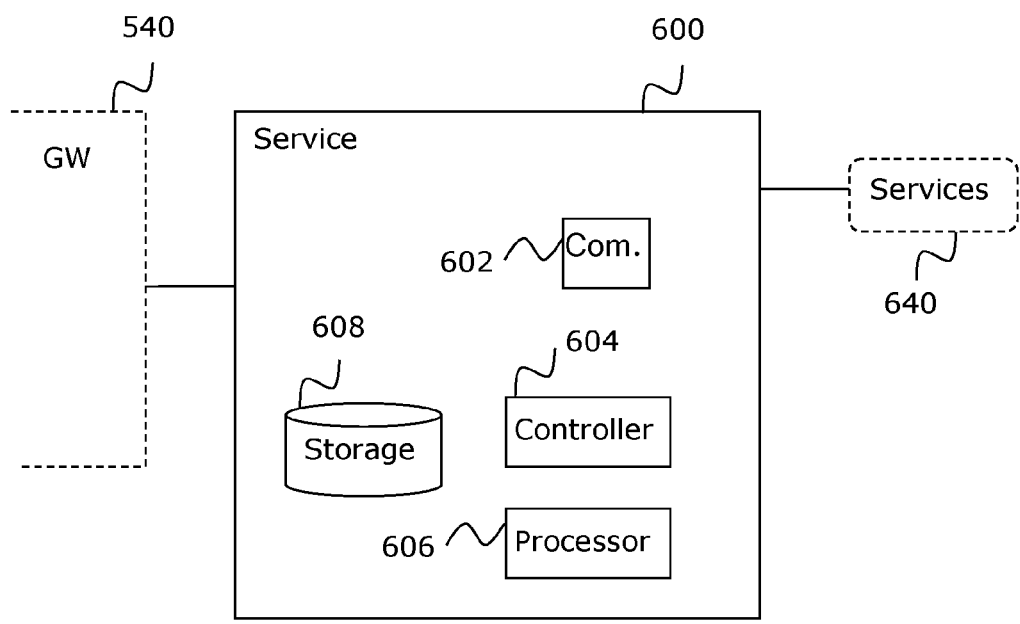
FIG. 6 is a schematic block diagram of a Service node, according to possible embodiments.

With reference to FIG. 6, which is a schematic block diagram, a service providing element 600, will now be described in accordance with one exemplifying embodiment.

The service providing element 600 is adapted to provide a service 640 to wireless communication devices (not shown) via a gateway 540 of a core network.

The service providing element 600 comprises a communication module 602, a controller 604, and optionally a processor 606 and a storage module 608.

The controller 604 is arranged to obtain service information of at least one service being applied by wireless communication devices. Such service information may comprise QoS information (Quality of Service), subscriber priority information, information about service characteristics, end of burst information, and information regarding size of data to be delivered or deadline for delivery, etc.

The communication module 602 is arranged to provide the service information to RAN nodes, such as RNCs or eNodeBs (not shown). The RAN nodes will then be able to adapt appropriate RAN-related parameters according to received service information. As stated above in conjunction with another embodiment, by taking the current situation of the applied services into consideration when controlling RAN-related parameters, a more effective use of installed communication resources may be achieved.

In another exemplifying embodiment, which is based on the one described above, the communication module 602 is further adapted to provide the service information included in downlink messages to the gateway 540 to be forwarded to the RAN node in a data structure which is readable by the RAN node. The communication module 602 is further adapted to send the downlink messages in IP-packets to be re-structured into GTP (General Packet Radio Service Tunnelling Protocol) extension headers or in GTP payload to the gateway before being sent to the RAN node.

Moreover, the controller 604 may be further adapted to include IP-addresses of appropriate wireless communication devices in the downlink messages. Thereby a simplified addressing may be achieved.

In addition, the communication module 602 may be further adapted to receive RAN-related parameters from appropriate RAN nodes according to the current RAN situation. The controller 604 may be further adapted to control at least service setting, such as rate adaption or choice of interval adaption, based on the received further RAN-related parameter. The communication module 602 may receive the RAN-related parameters in uplink messages, via the gateway 540.

Even if the RAN node and the service providing element of the above described embodiment relates to a UMTS system, it is to be noted that the concept is not limited to any specific radio access technology, and may be adapted to any other suitable radio access technology when appropriate, such as LTE, WLAN, Wi-Fi, etc. In a WLAN, the RAN node will be implemented as an AC (Access Controller).

Optionally, the service proving element 600 of the above described embodiments may comprise further components or units arranged to provide appropriate functionality. For instance, suitable processors 606 or storage units 608 may by arranged to provide improved calculation capacity for re-structuring downlink messages, or making use of statistic variations of service information.

Regarding some of the above described embodiments, the arrangements, nodes, and elements are schematically described and illustrated in order to simplify the understanding. However, a designer understands that the arrangements, nodes, and elements may be alternatively implemented within the disclosed concept when put into practice. For instance, any components and modules of one the arrangements, nodes, or elements may be arranged in another arrangement, node, or element, or that further arrangements, nodes or elements may be arranged. In an LTE system is some core node functionality arranged in a PDN (Packet Data Network) GW and some functionality in a Serving GW.

Figure 7:
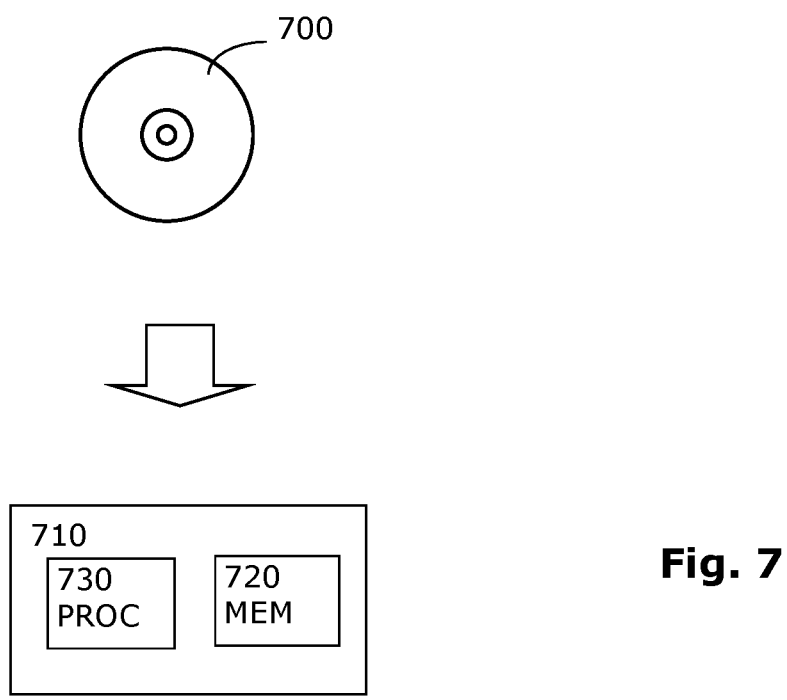
FIG. 7 is a schematic illustration of a computer program product, according to possible embodiments.

According to some exemplifying embodiments, a computer program product comprises a computer readable medium such as, for example, a diskette or a CD-ROM as illustrated by 700 in FIG. 7. The computer readable medium may have stored thereon a computer program comprising program instructions. The computer program may be loadable into a data-processing unit 730, which may, for example, be comprised in a communication network node 710. When loaded into the data-processing unit 830, the computer program may be stored in a memory 720 associated with or integral to the data-processing unit 730. According to some embodiments, the computer program may, when loaded into and run by the data-processing unit 730, cause the data-processing unit 730 to execute method steps according to, for example, the methods shown in the FIG. 3 or 4.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. The disclosed RAN nodes, core network nodes and service providing elements are also not limited to be implemented as specific physical nodes. A designer may select to implement corresponding RAN functions, core network functions and service providing functions as virtual nodes in any suitable servers which are connected to the communication network, within the disclosed concept.

Moreover, the corresponding functionality of the residential control node may further be applied in alternative locally arranged control nodes. For instance, enterprise control devices may be arranged in local environments within the disclosed concept.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A communication network, for enabling a service providing element to adapt delivery of a service based on a RAN-related parameter, the communication network comprising:

a Radio Access Network (RAN) node to obtain a RAN-related parameter and send the RAN-related parameter to the service providing element via a core network node;

the core network node to receive the RAN-related parameter from the RAN node and re-structure the RAN-related parameter into a data structure readable by the service providing element;

the service providing element to receive the RAN-related parameter, adapt a service delivery parameter based on the RAN-related parameter, obtain service information of at least one service being applied, and send the service information to the RAN node via the core network node, wherein the service information includes a deadline for delivery and is transmitted to the RAN node in a General Packet Radio Service Tunneling Protocol (GTP) extension header separately from content of the at least one service being applied;

the core network node further to receive the service information and re-structure the service information into a data structure readable by the RAN node; and the RAN node further to receive the service information and adapt at least one RAN-setting based on the service information.

2. The communication network of claim 1, wherein the RAN-related parameter comprises at least one of a Discontinuous Reception (DRX) cycles parameter, a state switching timers parameter, or a scheduling parameter.

3. The communication network of claim 1, wherein the service information comprises information corresponding to at least one of: QoS (Quality of Service), subscriber priority, end of burst, or size of data to be delivered.

4. The communication network of claim 1, wherein the adapted service delivery parameter includes one or more of: a rate adaption or an interval adaption.

5. The communication network of claim 1, wherein the service providing elements transmits the service information to the core network node on a separate path from content of the at least one service being applied.

6. A Radio Access Network (RAN) node adapted to enable a service providing element, in communication with the RAN node, to improve delivery of a service being performed in a communication network, the RAN node comprising:

at least one processor; and a non-transitory computer-readable medium having stored thereon instructions executable by the at least one processor to perform operations comprising:

obtaining a RAN-related parameter; and providing the RAN-related parameter to the service providing element, such that the service providing element can adapt a service delivery parameter based on the RAN-related parameter;

receiving, from the service providing element, service information relating to at least one service being provided via the RAN node, wherein the service information includes a deadline for delivery and is received in a General Packet Radio Service Tunneling Protocol (GTP) extension header separately from content of the at least one service being provided; and controlling a further RAN-related parameter based on the service information.

7. The RAN node according to claim 6, the operations further comprising:

providing the RAN-related parameter included in an uplink message to a core network node to be forwarded to the service providing element in a data structure readable by the service providing element.

8. The RAN node according to claim 7, the operations further comprising:
sending the uplink message in a General Packet Radio Service Tunneling Protocol (GTP) extension header or in a GTP payload to the core network node, to be re-structured into an IP-packet before being sent to the service providing element.

9. The RAN node according to claim 7, the operations further comprising:
including an identifier of the service providing element in the uplink message.

10. The RAN node according to claim 6, the operations further comprising:
selecting the RAN-related parameter from a set of: radio access technology parameter, available cell capacity parameter, achievable bitrate parameter, RAN state parameter, User Equipment (UE) parameter, and Discontinuous Reception (DRX) cycles parameter.

11. The RAN node according to claim 6, the operations further comprising:
controlling the further RAN-related parameter comprising at least one of Discontinuous Reception (DRX) cycles parameter, state switching timers parameter, or scheduling parameter, based on the service information comprising at least one of Quality of Service (QoS) or nature of the service.

12. The RAN node according to claim 6, the operations further comprising:
receiving the service information in a downlink message via a core network node.

13. The RAN node according to claim 6, wherein the service information comprises information corresponding to at least one of: QoS (Quality of Service), subscriber priority, end of burst, or size of data to be delivered.

14. A service providing element, adapted to enable a Radio Access Network (RAN) node, in communication with the service providing element to improve RAN settings, the service providing element comprising:
at least one processor; and
a non-transitory computer-readable medium having stored thereon instructions executable by the at least one processor to perform operations comprising:
obtaining service information of at least one service being applied, the service information including a deadline for delivery; and
providing the service information to the RAN node in a General Packet Radio Service Tunneling Protocol (GTP) extension header separately from content of the at least one service being applied, such that the RAN node can adapt a RAN-related parameter, based on the service information.

15. The service providing element according to claim 14, the operations further comprising:
providing the service information included in at least one downlink message to a core network node, the service information to be forwarded to the RAN node in a data structure readable by the RAN node.

16. The service providing element according to claim 15, the operations further comprising:
sending the at least one downlink message in an IP-packet to the core network node, to be re-structured into a General Packet Radio Service Tunneling Protocol (GTP) extension header or in a GTP payload before being sent to the RAN node.

17. The service providing element according to claim 15, the operations further comprising:
including an identifier of a wireless communication device served by the RAN node in the at least one downlink message.

18. The service providing element according to claim 14, the operations further comprising:
selecting the service information from a set of: Quality of Service, (QoS) information, subscriber priority information, information about service characteristics, end of burst information, and information regarding size of data to be delivered.

19. The service providing element according to claim 14, the operations further comprising:
receiving a further RAN-related parameter from the RAN node, wherein the further RAN-related parameter relates to current radio conditions of the RAN; and
controlling a service setting based on the further RAN-related parameter.

20. The service providing element according to claim 19, the operations further comprising:
receiving the further RAN-related parameter in at least one uplink packet via a core network node.

\* \* \* \* \*